US007471631B2

(12) United States Patent
Kang et al.

(10) Patent No.: US 7,471,631 B2
(45) Date of Patent: Dec. 30, 2008

(54) APPARATUS AND METHOD OF DESIGNATING VIRTUAL SITES USING POLICY INFORMATIONS IN MULTIPROTOCOL LABEL SWITCHING NETWORKS

(75) Inventors: Yoo Hwa Kang, Daegu (KR); Seong Yong Lim, Kyungsangbuk-do (KR); Joo Myoung Seok, Daejeon (KR); Jong Hyup Lee, Daejeon (KR); Hae Won Jung, Daejeon (KR); Young Sun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 875 days.

(21) Appl. No.: 10/843,537

(22) Filed: May 10, 2004

(65) Prior Publication Data

US 2005/0120089 A1    Jun. 2, 2005

(30) Foreign Application Priority Data

Nov. 28, 2003    (KR)    ...................... 10-2003-0085809

(51) Int. Cl.
*H04L 12/28*    (2006.01)
*H04L 12/56*    (2006.01)
*G01R 31/08*    (2006.01)
*G06F 11/00*    (2006.01)
*G08C 15/00*    (2006.01)
*H04J 1/16*    (2006.01)
*H04J 3/14*    (2006.01)
*H04L 1/00*    (2006.01)
*H04L 12/26*    (2006.01)

(52) U.S. Cl. .................. 370/235; 370/392; 370/395.21; 370/395.43

(58) Field of Classification Search .................. 370/392
See application file for complete search history.

(56) References Cited

U.S. PATENT DOCUMENTS

| 6,693,878 | B1 * | 2/2004 | Daruwalla et al. | 370/235 |
| 2002/0145981 | A1 * | 10/2002 | Klinker et al. | 370/244 |
| 2002/0184388 | A1 * | 12/2002 | Yaseen et al. | 709/242 |
| 2004/0037275 | A1 * | 2/2004 | Li et al. | 370/370 |
| 2004/0174879 | A1 * | 9/2004 | Basso et al. | 370/392 |

* cited by examiner

*Primary Examiner*—Chau Nguyen
*Assistant Examiner*—Andrew Chriss
(74) *Attorney, Agent, or Firm*—Blakley, Sokoloff, Taylor & Zafman LLP

(57) ABSTRACT

Provided are an apparatus and method of dividing virtual sites using policy properties in multiprotocol label switching (MPLS) networks. In this method, when multiple virtual sites are selected with respect to one interface, not only usually used source IP addresses and VLAN tags but also TOS fields and MPLS labels are used so that more various kinds of virtual sites can be selected. Also, since the TOS fields and MPLS labels can express additional QoS-related information, differentiated services can be provided by selecting a wider variety of kinds of virtual sites.

9 Claims, 5 Drawing Sheets

APPARATUS AND METHOD OF DESIGNATING VIRTUAL SITES USING POLICY INFORMATIONS IN MULTIPROTOCOL LABEL SWITCHING NETWORKS

This application claims the priority of Korean Patent Application No. 2003-85809, filed on Nov. 28, 2003 in the Korean Intellectual Property Office, the disclosure of which is incorporated herein in its entirety by reference.

BACKGROUND OF THE INVENTION

1. Field of the Invention

The present invention relates to an apparatus and a method of managing virtual private networks (VPNs), and more particularly, to an apparatus and method of designating virtual sites using policy information in multiprotocol label switching (MPLS) networks.

2. Description of the Related Art

Nowadays, subscribers have taken a lease on point-to-point private lines from network operators, established their own wide area networks (WANs), and utilized them as private networks. These private networks are called virtual private networks (VPNs) since the private lines have been superseded by various kinds of virtual lines. Owing to the development of the Internet, as many network operators have replaced frame relay/asynchronous transfer mode (FR/ATM) networks by Internet protocol (IP) networks, techniques of providing VPNs using the IP networks have been developed.

Multiprotocol label switching (MPLS) is a technique capable of using advantages of ATM in IP networks, a connection-oriented technique, and also a tunneling technique using a label stack. Since the MPLS exhibits a high quality of service (QoS) and supports a wide protection function, it is becoming an essential VPN technique provided by the network operators instead of conventional tunneling protocol.

FIG. 1 is a construction diagram of an MPLS-VPN 10 that supports VPN sites. Referring to FIG. 1, in the MPLS-VPN 10 supporting VPN sites, a first customer edge (CE1) and a second CE (CE2), which are connected to a first provider edge (PE1) and a second provider edge (PE2), respectively, constitute a first site and a second site, respectively.

Generally, to provide a virtual private network (VPN) service in the MPLS network, as shown in FIG. 1, it is required to select one VPN group for one interface of a PE router. In this case, each interface of the PE router is one-to-one connected to a CE router and constitutes one VPN group through the CE router. Although the VPN service for each VPN group can be provided through the MPLS network, it is impossible to provide differentiated services in each VPN group. To solve this problem, a method of dividing one VPN site into several virtual sites by customers has been proposed.

FIG. 2 is a construction diagram of the MPLS network that supports VPN virtual sites. Referring to FIG. 2, CE1 and CE2, which are connected to PE1 and PE2 of the VPN virtual site, respectively, each include two virtual sites. That is, the CE1 includes a first virtual site and a second virtual site, and the CE2 include a third virtual site and a fourth virtual site.

As can be seen from FIG. 2, when each VPN group connected to one PE interface is re-divided into small groups, each small group is defined as a virtual site, and virtual sites can be divided using policy information, such as source IP addresses or virtual local area network (VLAN) tags.

However, the re-division of each VPN group is enabled only when a VPN connected to a CE router is in a LAN environment that provides VLAN services or an IP network from which source IP addresses can be known. In addition, QoS services are essentially required for the VPN services. If the MPLS network utilizes the VLAN tags or source IP addresses, it is difficult to provide a variety of QoS services. Accordingly, various kinds of policy information are required for dividing virtual sites, and it is necessary to develop new methods of providing differentiated services based on the policy information.

SUMMARY OF THE INVENTION

The present invention provides an apparatus and method of dividing virtual sites using policy properties in MPLS networks, which can effectively divide a plurality of virtual sites with respect to one interface of a PE router connected to a CE router by dividing the virtual sites using not only usually used source IP addresses and VLAN tags but also type of service (TOS) fields of an IP packet and MPLS labels as the policy information.

The present invention also provides a computer readable medium having embodied thereon a computer program for the foregoing method according to the present invention.

According to an aspect of the present invention, there is provided an apparatus of designating virtual sites using policy information in multiprotocol label switching (MPLS) networks, comprising a data packet receiving part, which receives a virtual private network (VPN) data packet from a line interface; an interface managing part, which manages the interface; an operator command processing part, which sets a VPN routing and forwarding table (VRF) corresponding to each the interface by processing commands related to virtual sites and stores information on the VRF in an interface table; the interface table, which stores the kinds and values of the policy properties for dividing the virtual sites that are designated in the interface, and maps multiple VRF tables into respective virtual sites in response to the commands related to virtual sites, which are output from the operator command processing part; the VRF table, which stores routing information and forwarding information for each site of the VPN and all the virtual sites; a VPN group processing part, which extracts information on the VRF table mapped into the interface from the interface table and performs general VPN data processing if virtual sites are not designated in the interface; a virtual site processing part, which finds a VRF table corresponding to the policy information of the packet from the interface table if virtual sites are designated in the interface; a forwarding processing part, which obtains an output line interface by looking up the VRF table found by the virtual site processing part; and a data packet transmitting part, which forwards the packet through the output line interface.

According to another aspect of the present invention, there is provided a method of designating virtual sites using policy information in multiprotocol label switching (MPLS) networks, comprising (a) detecting a line interface receiving a packet and deciding whether or not a virtual site is selected in the interface; (b) finding a VRF table corresponding to a property of the interface by looking up an interface table if it is decided that the virtual site is not selected in the interface; (c) finding the VRF table corresponding to the property of the virtual site from the interface table based on the policy properties if it is decided that the virtual site is selected in the interface; and (d) forwarding the packet through an output line interface obtained by looking up the VRF table found in step (b) or (c).

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
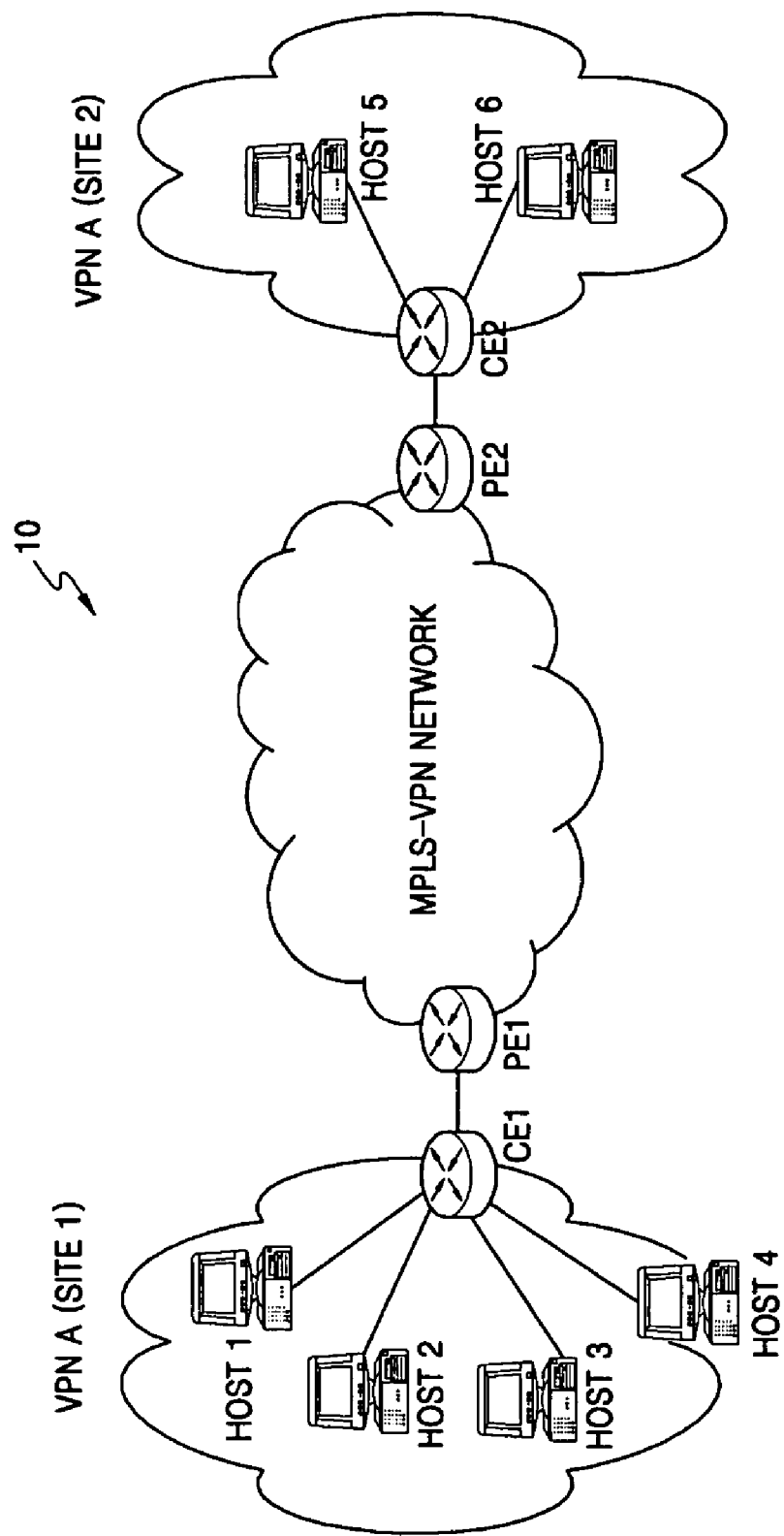
FIG. 1 is a construction diagram of an MPLS-VPN that supports VPN sites.
Figure 2:
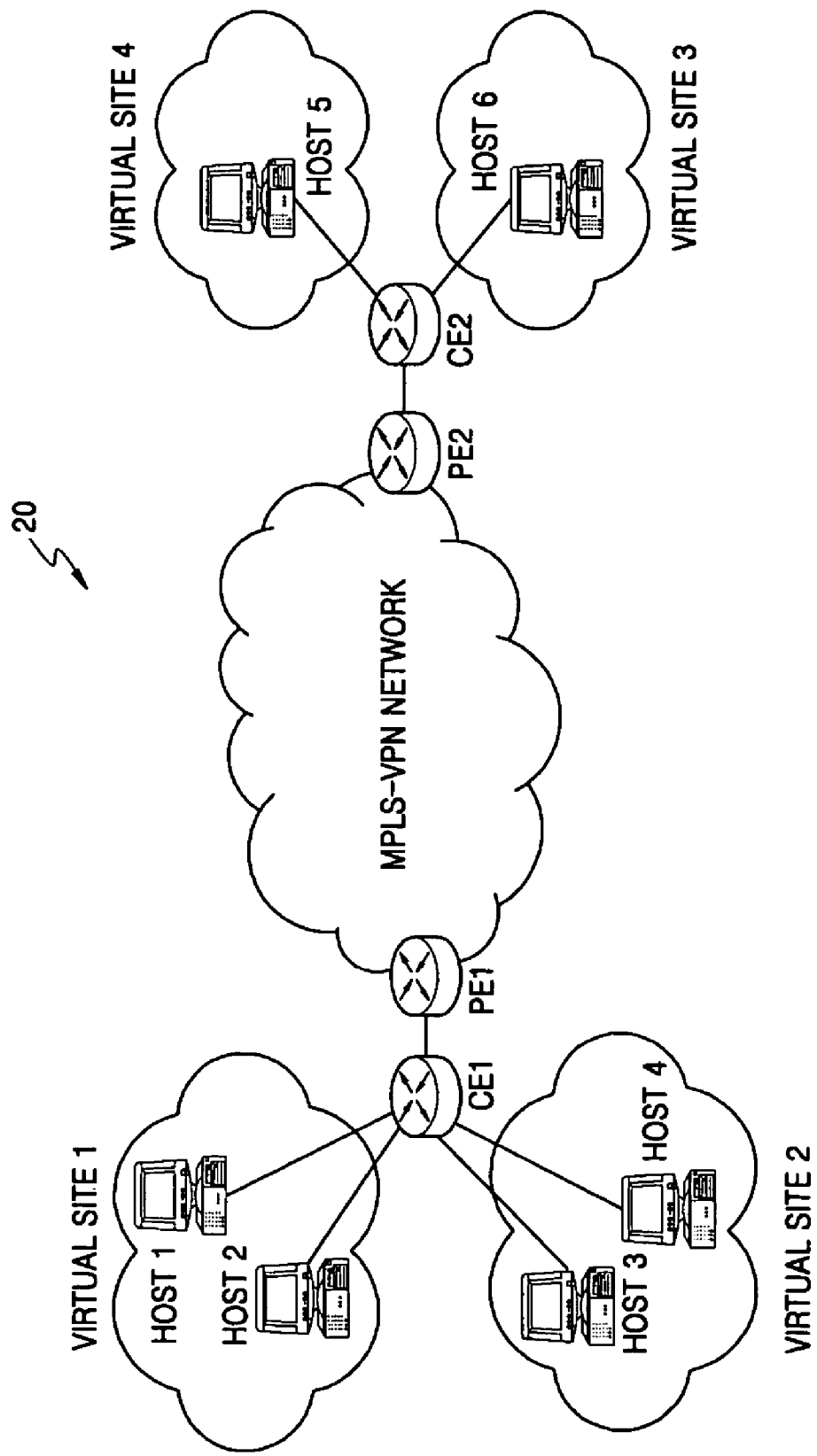
FIG. 2 is a construction diagram of the MPLS network that supports VPN virtual sites.
Figure 3:
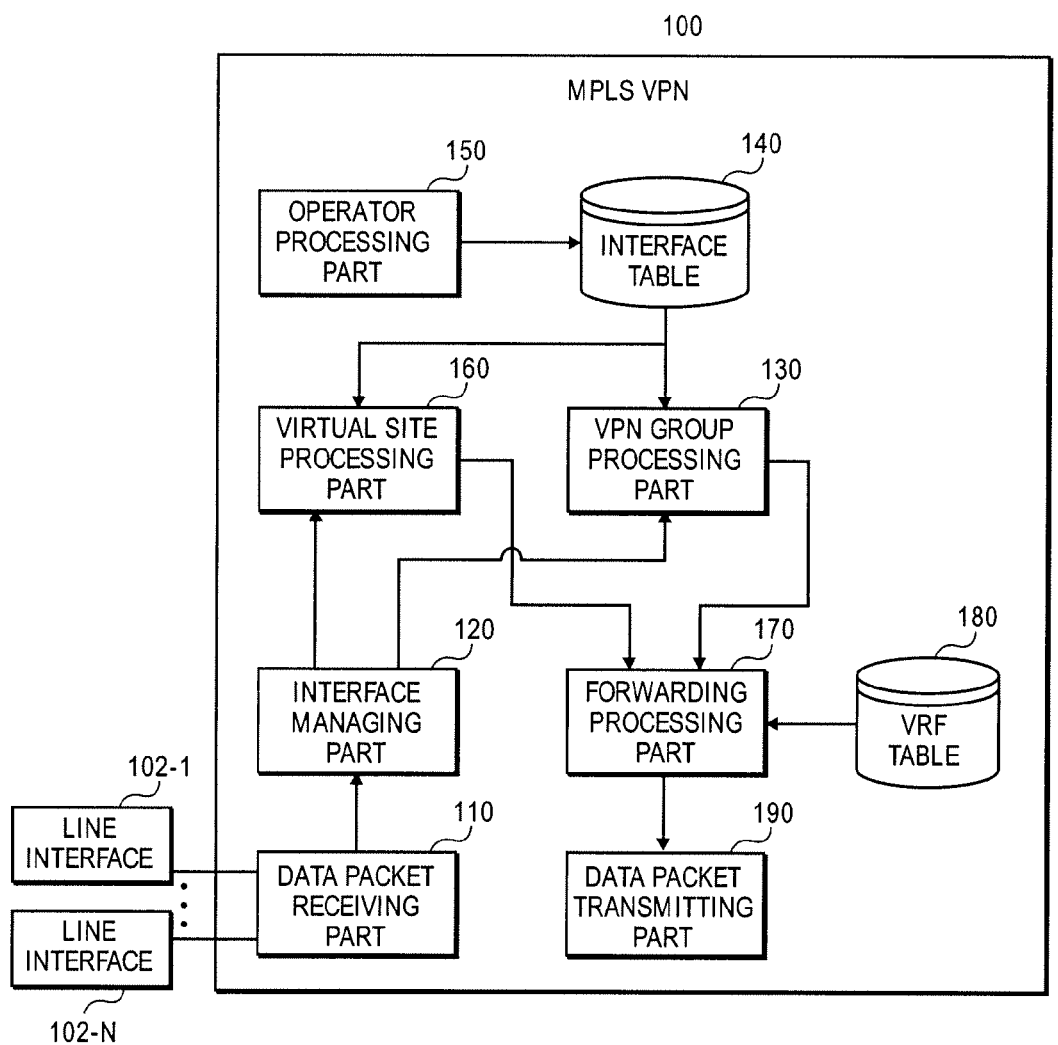
FIG. 3 is a block diagram of an MPLS-VPN, which divides virtual sites using policy properties in MPLS networks according to the present invention.

FIG. 3 is a block diagram of an MPLS-VPN 100, which divides virtual sites using policy properties in MPLS networks according to the present invention. Each of function blocks shown in FIG. 3 can be embodied on a PE included in the MPLS-VPN 100.

TABLE 1

| Interface Name | Kind | Property | Property Value | Related VRF |
|---|---|---|---|---|
| eth0 | Single VRF | | | VRF1 |
| eth1 | Multiple VRF | IP Address | 127.29.2.0/24 | VRF2 |
| | | | 127.29.3.0/24 | VRF3 |
| eth2 | Multiple VRF | MPLS Label | 20 | VRF5 |
| | | | 30 | VRF6 |
| | | | 40 | VRF7 |
| eth3 | Multiple VRF | VLAN TAG | 3 | VRF8 |
| | | | 4 | VRF9 |
| eth4 | Multiple VRF | TOS | 1 | VRF10 |
| | | | 2 | VRF11 |

As can be seen from table 1, the interface table 140 maps the VRF with respect to both the VPN site and the virtual site.

For the interface "eth0", only the VPN site is designated and thus the single VRF table is mapped. However, for each of the interfaces "eth1" through "eth4", since the virtual site is designated, different multiple VRF tables are mapped according to the policy properties, for example, TOS fields of an IP packet, source IP addresses, virtual LAN (VLAN) tags, and MPLS labels.

The following table 2 shows the kinds of operator commands required for dividing the virtual sites.

TABLE 2

| Operator Command | Examples of Command |
|---|---|
| (no) associate multivrf interface name {ip-address\vlan-tag\mpls-label\tos} (no) vrf selection ipaddress ip-address/prefix length vrf vrfname (no) vrf selection vlan tag vlan-tag value vrf vrfname (no) vrf selection mpls label mpls-label value vrf vrfname (no) vrf selection tos tos-value vrf vrfname | > associate multivrf eth0 ip-address<br>> no associate multivrf eth0<br>> vrf selection ip-address 172.29.9.7/24 vrf vrf1<br>> no vrf selection ip-address 172.29.9.7/24 vrf vrf1<br>> vrf selection vlan tag 0xf5 vrf vrf1<br>> no vrf selection vlan tag 0xf5 vrf vrf1<br>> vrf selection mpls label 12 vrf vrf1<br>> no vrf selection mpls label 12 vrf vrf1<br>> vrf selection tos 0xf5 vrf1<br>> no vrf selection tos 0xf5 vrf1 |

Referring to FIG. 3, the MPLS VPN 100 includes a data packet receiving part 110, an interface managing part 120, a VPN group processing part 130, an interface table 140, an operator command processing part 150, a virtual site processing part 160, a forwarding processing part 170, and a VPN routing and forwarding table (hereinafter, a VRF table) 180.

The data packet receiving part 110 receives a VPN data packet, and the interface managing part 120 manages an interface receiving the packet. The operator command processing part 150 processes commands related to virtual sites, selects a VRF corresponding to the interface, and stores the VRF in the interface table 140.

The interface table 140 stores the kinds and values of policy properties required for dividing virtual sites for each interface and maps multiple VRF into respective sites in response to the commands related to virtual sites which are generated from the operator command processing part 150.

The following table 1 exemplarily illustrates a construction of the interface table 140 when both the VPN site and the virtual site are supported.

In table 2, the command "associate multivrf" is used to designate the kinds of policy properties of virtual sites, which define the VRF table connected to the virtual sites in one interface. The number of policy properties designated by the command "associate multivrf" is presently 4, and each kind of policy property has a command for designating a real property value.

A real property value can be designated using the command "vrf selection", and a VRF table connected to the property value can be designated using keywords "vrf selection tos," "vrf selection ip-address," "vrf selection vlan tag," and "vrf selection mpls label" according to the kind of designated property value. An example of the VRF table using the property of VLAN TAG will now be described.

(1) (config)# create vrf vrf1
(2) (config)# configure vrf vrf1
(3) (config-vrf)# associate multivrf eth0 vlan-tag
(4) (config-vrf)# vrf selection vlan tag 0x11 vrf vrf1

The operator command processing part 150 (1) creates a new VRF1 table, (2) converts standby mode into a VRF mode that can change VRF information so as to divide virtual sites, (3) designates VLAN TAG as a kind of policy property for supporting the virtual site with respect to the interface "eth0," (4) maps the VRF1 table into a value VLAN TAG 0×11 with respect to the interface "eth0", and stores this information in the interface table.

The VRF table 180 is a combination of a VPN routing table, which is multiplexed according to respective virtual sites, and a VPN forwarding table, and stores routing information and forwarding information according to respective sites.

The VPN group processing part 130 extracts information on the VRF table mapped into a certain interface from the interface table 140 and performs general VPN data processing when a virtual site is not designated in the interface. If the virtual site is designated in the interface, the virtual site processing part 160 finds a VRF table corresponding to policy information obtained at a packet received from the interface table 140.

If the virtual site processing part 160 finds the VRF table corresponding to the packet, the forwarding processing part 170 looks up the VRF table with reference to a destination IP address of the packet and obtains an output line interface. The data packet transmitting part 190 forwards the packet through the output line interface determined by the forwarding processing part 170.

A method of dividing virtual sites in the foregoing MPLS VPN 100 will now be described.

Figure 4A:
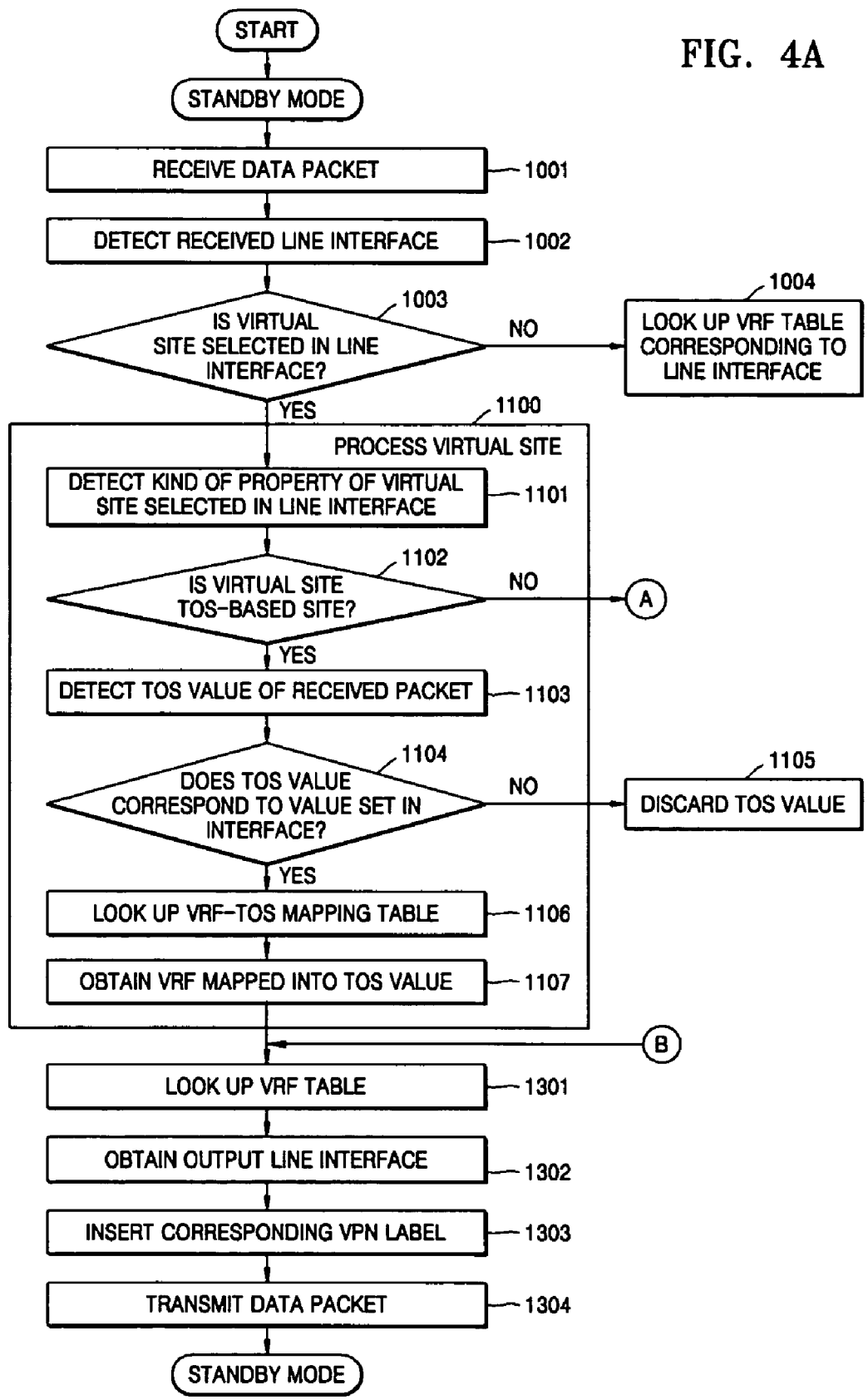
FIG. 4A is a flowchart illustrating the operations of Ingress PE that supports a TOS field-based virtual site.
Figure 4B:
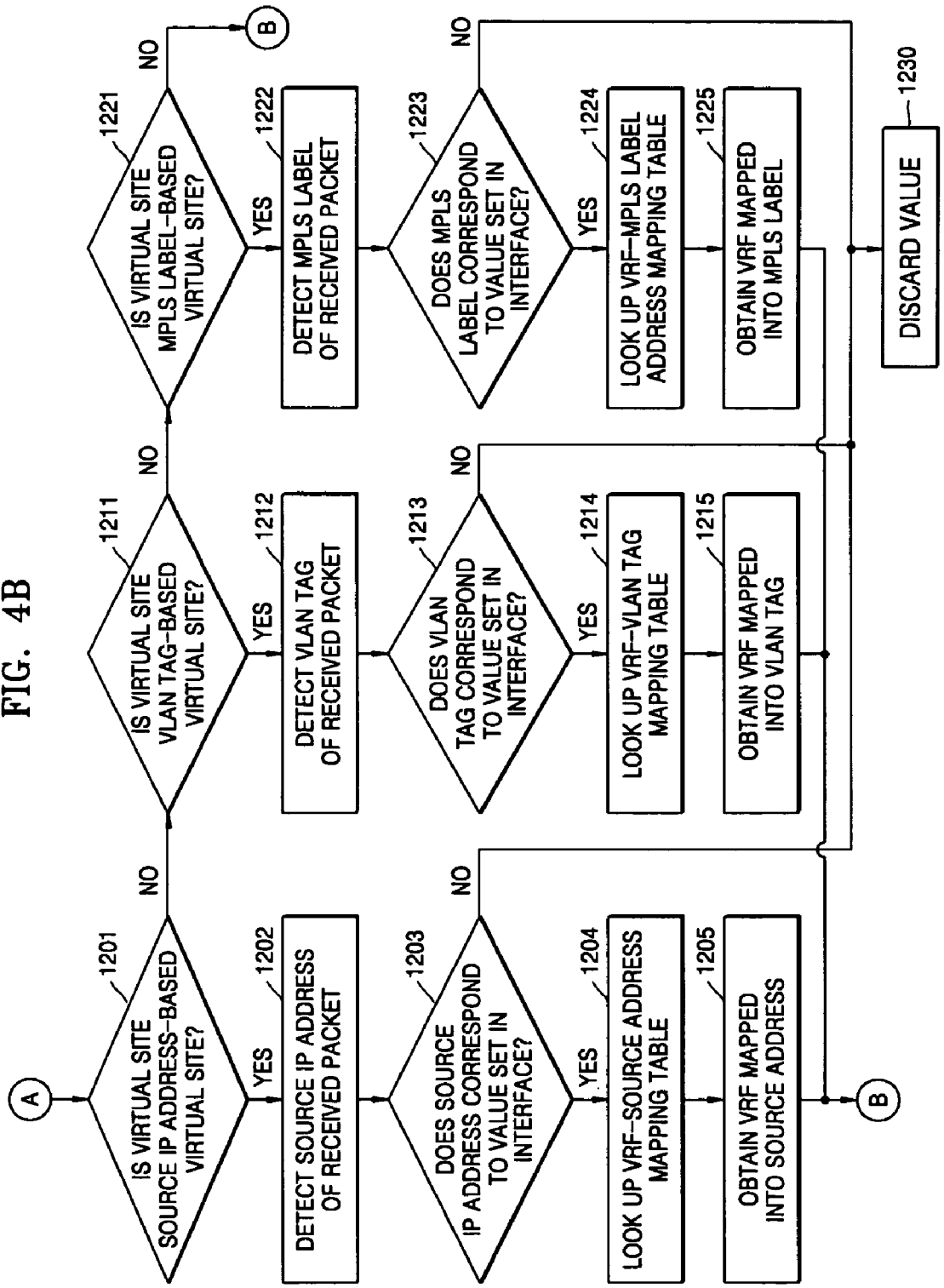
FIG. 4B is a flowchart illustrating the operations of Ingress PE that supports a virtual site based on policy information according to the present invention.

FIGS. 4A and 4B are flowcharts illustrating MPLS VPN services that support virtual sites using policy information according to the present invention. FIG. 4A illustrates the operations of Ingress PE that supports a TOS-based virtual site according to the present invention, and FIG. 4B illustrates the operations of Ingress PE that supports a virtual site based on policy information according to the present invention.

Referring to FIG. 4A, if a packet is received through a line interface connected to the MPLS VPN 100 in a standby mode in step 1001, the line interface receiving the packet is detected in step 1002, and it is decided whether or not a virtual site is designated in the line interface in step 1003. In the method of the present invention, the virtual site is not designated as a default value.

If it is decided that the virtual site is not designated in the line interface, i.e., the default value is set in step 1003, the VPN group processing part 130 looks up an interface table and finds a VRF table corresponding to the line interface in step 1004. If it is decided that the virtual site is designated in the line interface, i.e., the default value is not set in step 1003, the virtual site processing part 160 looks up the interface table and finds a VRF table corresponding to the property of the virtual site in step 1100. In step 1100, the virtual site is processed based on a TOS field value.

To process the virtual site in step 1100, initially, the property of the virtual site designated in the line interface is detected in step 1101. That is, the kind of policy information for selecting the virtual site is detected. The policy information for designating the virtual site includes TOS fields of an IP packet, source IP addresses, VLAN tags, and MPLS labels. Since the TOS fields and MPLS labels can express additional QoS-related information, differential services can be provided by designating a wider variety of virtual sites. The policy information used for dividing virtual sites should be provided from a site to a packet, and the PE router should have a function for finding policy information from the received packet.

The method of designating virtual sites using the TOS field as a policy property is described in detail in step 1100 of FIG. 4A, and a method of designating virtual sites using a source IP address, a VLAN tag, or an MPLS label as a policy property will be described in detail with reference to FIG. 4B.

It is decided whether or not the virtual site is a TOS-based virtual site in step 1102. If it is decided that the virtual site is not the TOS-based virtual site, the virtual site processing part 160 performs processing for a virtual site based on policy information other than the TOS field (refer to FIG. 4B). If it is decided that the virtual site is the TOS-based virtual site, the virtual site processing part 160 detects a TOS field for the received packet in step 1103 and decides whether or not the TOS field corresponds to a value set in the interface in step 1104.

If it is decided that the TOS field does not correspond to the value set in the interface in step 1104, the TOS field is discarded in step 1105. If it is decided that the TOS field corresponds to the value set in the interface, the virtual site processing part 160 refers to the interface table 140 and looks up a VRF-TOS mapping table in step 1106. As a result, a VRF table corresponding to the TOS field is obtained in step 1107.

Once the virtual site processing part 160 finishes all the operations, the forwarding processing part 170 looks up the VRF table 1301 with reference to a destination IP address of the received packet in step 1301, obtains an output line interface in step 1302, and inserts a corresponding VPN label in step 1303. The data packet transmitting part 190 forwards the packet through the output line interface determined by the forwarding processing part 170.

The method of designating a virtual site based on policy information other than the TOS field will now be described.

Referring to FIG. 4B, it is decided whether or not the virtual site is a virtual site based on a source IP address in step 1201.

If it is decided that the virtual site is a virtual site based on the source IP address, a source IP address of a received packet is detected in step 1202. Then, it is decided whether or not the IP address corresponds to a value set in the interface in step 1203. If it is decided that the IP address does not correspond to the value set in the interface, the IP address is discarded in step 1230. If it is decided that the IP address corresponds to the value set in the interface, the virtual site processing part 160 refers to the interface table 140 and looks up a VRF-source IP address mapping table in step 1204. As a result, a VRF table corresponding to the IP address is obtained in step 1205.

If it is decided that the virtual site is not a virtual site based on the source IP address in step 1201, it is decided whether or not the virtual site is a virtual site based on a VLAN tag in step 1211.

If it is decided that the virtual site is a virtual site based on the VLAN tag, a VLAN tag of a received packet is detected in step 1212. Then, it is decided whether or not the VLAN tag corresponds to a value set in the interface in step 1213. If the decision is that the VLAN tag does not correspond to the value set in the interface, the VLAN tag is discarded in step 1230. If the decision is that the VLAN tag corresponds to the value set in the interface, the virtual site processing part 160 refers to the interface table 140 and looks up a VRF-VLAN tag mapping table in step 1214. As a result, a VRF table corresponding to the VLAN tag is obtained in step 1215.

If it is decided that the virtual site is not a virtual site based on the VLAN tag in step 1211, it is decided whether or not the virtual site is a virtual site based on an MPLS label in step 1221. If it is decided that the virtual site is a virtual site based on the MPLS label, an MPLS label of a receiving packet is detected in step 1222. Then, it is decided whether not the MPLS label corresponds to a value set in the interface in step 1223. If the MPLS label does not correspond to the value set in the interface, the MPLS label is discarded in step 1230. If it is decided that the MPLS label corresponds to the value set in the interface, the virtual site processing part 160 refers to the interface table 160 and looks up a VRF-MPLS label mapping table in step 1224. As a result, a VRF table corresponding to the MPLS table is obtained in step 1225.

Once the virtual site processing part 160 finishes all the operations, the forwarding processing part 170 looks up a corresponding VRF table with reference to a destination IP address value of the received packet (in step 1301 of FIG. 4A), obtains an output line interface (in step 1302 of FIG. 4A), and inserts a corresponding VPN label (in step 1303 of FIG. 4A). The data packet transmitting part 190 forwards the packet through the output line interface determined by the forwarding processing part 170 (in step 1304 of FIG. 4A).

As described above, in the apparatus and method of dividing virtual sites according to the present invention, when multiple virtual sites are designated with respect to one interface, not only usually used source IP addresses and VLAN tags but also TOS fields and MPLS labels are used so that a wider variety of kinds of virtual sites can be selected. Also, since the TOS fields and MPLS labels can express additional QoS-related information, differentiated services can be provided by selecting a wider variety of kinds of virtual sites.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus of designating virtual sites using policy information in multiprotocol label switching (MPLS) networks, the apparatus comprising:
    a data packet receiving part, which receives a virtual private network (VPN) data packet from a detected line interface of a plurality of line interfaces;
    an interface managing part, which manages the plurality of line interfaces;
    an operator command processing part, which sets a VPN routing and forwarding table (VRF) corresponding to each respective line interface by processing commands related to virtual sites and stores information regarding the VRF in an interface table;
    the interface table, which stores the kinds and values of one or more policy properties for dividing the virtual sites that are designated for the detected line interface, and maps multiple VRF tables to corresponding respective virtual sites in response to the commands related to the respective virtual sites, which are output from the operator command processing part;
    a plurality of VRF tables, which stores routing information and forwarding information for each site of the VPN and all the virtual sites;
    a VPN group processing part, which extracts information regarding a VRF table corresponding to the detected line interface from the interface table and performs general VPN data processing if virtual sites are not designated for the detected line interface;
    a virtual site processing part, which finds a VRF table that corresponds to policy information of the packet from the interface table if virtual sites are designated for the detected line interface;
    a forwarding processing part, which obtains an output line interface by looking up the VRF table found by the virtual site processing part; and
    a data packet transmitting part, which forwards the packet through the output line interface.

2. The apparatus of claim 1, wherein the VRF table includes a VPN routing table and a VPN forwarding table.

3. The apparatus of claim 1, wherein the policy information includes type of service (TOS) fields, source IP addresses, VLAN tags, and MPLS labels.

4. A method of designating virtual sites using policy information in multiprotocol label switching (MPLS) networks, the method comprising:
    (a) detecting a line interface from which a packet is received;
    (b) finding a VRF table that corresponds to a property of the detected line interface by looking up an interface table if a virtual site is not designated for the detected line interface;
    (c) finding a VRF table corresponding to a property of a virtual site from the interface table based on a policy property if a virtual site is designated for the detected line interface; and
    (d) forwarding the packet through an output line interface obtained by looking up the VRF table found in step (b) or (c).

5. The method of claim 4, wherein the interface table stores the kinds and values of policy properties for dividing the virtual sites and maps multiple VRF tables to respective virtual sites.

6. The method of claim 4, wherein the VRF table includes a VPN routing table and a VPN forwarding table, which are combined for respective virtual sites and stores routing information and forwarding information for each site.

7. The method of claim 4, wherein the policy information includes type of service (TOS) fields, source IP addresses, VLAN tags, and MPLS labels.

8. The method of claim 4, wherein step (c) comprises:
    (c1) obtaining the kind of policy information for designating the virtual site by detecting the property of the virtual site selected in the line interface;
    (c2) finding a VRF table corresponding to the TOS field of the packet by looking up the interface table if the virtual site is based on a TOS field of an IP packet;
    (c3) finding a VRF table corresponding to source IP of the packet by looking up the interface table if the virtual site is a site based on a source IP address;
    (c4) finding a VRF table corresponding to a VLAN tag of the packet by looking up the interface table if the virtual site is a site based on a VLAN tag; and
    (c5) finding a VRF table corresponding to an MPLS label of the packet by looking up the interface table if the virtual site is a sited based on an MPLS label.

9. A computer readable storage medium having embodied thereon a computer program executable by a computer to perform the method according to any one of claims 4 through 8.

* * * * *